US012739599B2

(12) United States Patent
Dawar et al.

(10) Patent No.: US 12,739,599 B2
(45) Date of Patent: Sep. 15, 2026

(54) MOTION SENSOR FUSION IN INDOOR LOCALIZATION

(71) Applicant: Samsung Electronics Co., Ltd., Suwon-si (KR)

(72) Inventors: Neha Dawar, McKinney, TX (US); Yuming Zhu, Plano, TX (US); Rebal Al Jurdi, Allen, TX (US); Boon Loong Ng, Plano, TX (US); Jianzhong Zhang, Dallas, TX (US); Qiang Xie, Suwon-si (KR); Sejong Yoon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 328 days.

(21) Appl. No.: 18/627,365

(22) Filed: Apr. 4, 2024

(65) Prior Publication Data

US 2024/0357320 A1 Oct. 24, 2024

Related U.S. Application Data

(60) Provisional application No. 63/460,527, filed on Apr. 19, 2023.

(51) Int. Cl.

| | |
|---|---|
| ***H04L 1/00*** | (2006.01) |
| ***G01C 21/16*** | (2006.01) |
| ***G01C 21/20*** | (2006.01) |
| ***H04W 4/029*** | (2018.01) |
| ***H04W 64/00*** | (2009.01) |

(52) U.S. Cl.
CPC .......... *H04W 4/029* (2018.02); *G01C 21/183* (2020.08); *G01C 21/206* (2013.01); *H04W 64/006* (2013.01)

(58) Field of Classification Search
CPC ... H04W 4/029; H04W 64/006; H04W 4/027; G01C 21/183; G01C 21/206; G01C 21/1654; G01C 22/006
USPC ........................................................ 455/456.1
See application file for complete search history.

(56) References Cited

U.S. PATENT DOCUMENTS

| | | | | |
|---|---|---|---|---|
| 10,139,232 | B2 | 11/2018 | Han et al. | |
| 10,190,881 | B2 | 1/2019 | Yuan et al. | |
| 2015/0350845 | A1 * | 12/2015 | Patel | H04W 4/029 455/457 |

(Continued)

FOREIGN PATENT DOCUMENTS

| | | | |
|---|---|---|---|
| CN | 116772865 | A | 9/2023 |
| CN | 113916221 | B | 1/2024 |

(Continued)

*Primary Examiner* — Tanmay K Shah

(57) ABSTRACT

A method includes receiving at least one wireless signal measurement and motion sensor measurements. The method also includes generating a location estimate based on the at least one wireless signal measurement. The method also includes determining whether a step is present based on the motion sensor measurements. The method also includes, in response to determining that a step is present, determining a step heading offset based on the location estimate and the motion sensor measurements, and determining a step length and heading based on the motion sensor measurements and the step heading offset. The method also includes determining a location of an object based on at least one of (i) the at least one wireless signal measurement or (ii) the step length and heading.

20 Claims, 13 Drawing Sheets

(56) References Cited

U.S. PATENT DOCUMENTS

| | | | | |
|---|---|---|---|---|
| 2018/0206099 | A1 * | 7/2018 | O'Connor | G01K 1/026 |
| 2020/0264317 | A1 * | 8/2020 | Faragher | G01S 19/26 |
| 2024/0230831 | A1 * | 7/2024 | Dhekne | A61B 34/20 |

FOREIGN PATENT DOCUMENTS

| | | | | | |
|---|---|---|---|---|---|
| GB | 2614583 | A | * | 7/2023 | H04W 4/33 |
| WO | WO-2017180698 | A1 | * | 10/2017 | G01C 21/206 |
| WO | 2024010327 | A1 | | 1/2024 | |

* cited by examiner

MOTION SENSOR FUSION IN INDOOR LOCALIZATION

CROSS-REFERENCE TO RELATED APPLICATION(S) AND CLAIM OF PRIORITY

This application claims priority under 35 U.S.C. § 119(e) to U.S. Provisional Patent Application No. 63/460,527, filed on Apr. 19, 2023, which is hereby incorporated by reference in its entirety.

TECHNICAL FIELD

This disclosure relates generally to wireless communications systems. Embodiments of this disclosure relate to methods and apparatuses for motion sensor fusion in indoor localization of an object.

BACKGROUND

Indoor positioning has grown in popularity over the last decade with applications in both smart homes and commercial facilities. While most of the existing indoor positioning techniques (e.g., Bluetooth and WiFi) suffer from poor accuracy, ultra-wide band (UWB) can provide a robust and accurate indoor localization solution. UWB-based localization techniques generally use two-way ranging (TWR) or time-of-arrival (ToA). However, these techniques cannot cater to multiple users at the same time, hence are not very scalable. On the other hand, in downlink time difference-of-arrival (DL-TDoA) the target does not directly communicate with the UWB anchors, but only listens to the downlink messages from the anchors. Hence, DL-TDoA not only serves multiple users at the same time, but also does not pose any privacy concerns.

SUMMARY

Embodiments of the present disclosure provide methods and apparatuses for motion sensor fusion in indoor localization of an object.

In one embodiment, a method includes receiving at least one wireless signal measurement and motion sensor measurements. The method also includes generating a location estimate based on the at least one wireless signal measurement. The method also includes determining whether a step is present based on the motion sensor measurements. The method also includes, in response to determining that a step is present, determining a step heading offset based on the location estimate and the motion sensor measurements, and determining a step length and heading based on the motion sensor measurements and the step heading offset. The method also includes determining a location of an object based on at least one of (i) the at least one wireless signal measurement or (ii) the step length and heading.

In another embodiment, a device includes a transceiver and a processor operably connected to the transceiver. The processor is configured to: receive at least one wireless signal measurement and motion sensor measurements; generate a location estimate based on the at least one wireless signal measurement; determine whether a step is present based on the motion sensor measurements; in response to determining that a step is present, determine a step heading offset based on the location estimate and the motion sensor measurements, and determine a step length and heading based on the motion sensor measurements and the step heading offset; and determine a location of an object based on at least one of (i) the at least one wireless signal measurement or (ii) the step length and heading.

In another embodiment, a non-transitory computer readable medium includes program code that, when executed by a processor of a device, causes the device to: receive at least one wireless signal measurement and motion sensor measurements; generate a location estimate based on the at least one wireless signal measurement; determine whether a step is present based on the motion sensor measurements; in response to determining that a step is present, determine a step heading offset based on the location estimate and the motion sensor measurements, and determine a step length and heading based on the motion sensor measurements and the step heading offset; and determine a location of an object based on at least one of (i) the at least one wireless signal measurement or (ii) the step length and heading.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. As used herein, such terms as "1st" and "2nd," or "first" and "second" may be used to simply distinguish a corresponding component from another and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

The present disclosure covers several components which can be used in conjunction or in combination with one another or can operate as standalone schemes. Certain embodiments of the disclosure may be derived by utilizing a combination of several of the embodiments listed below. Also, it should be noted that further embodiments may be derived by utilizing a particular subset of operational steps as disclosed in each of these embodiments. This disclosure should be understood to cover all such embodiments.

Figure 1:
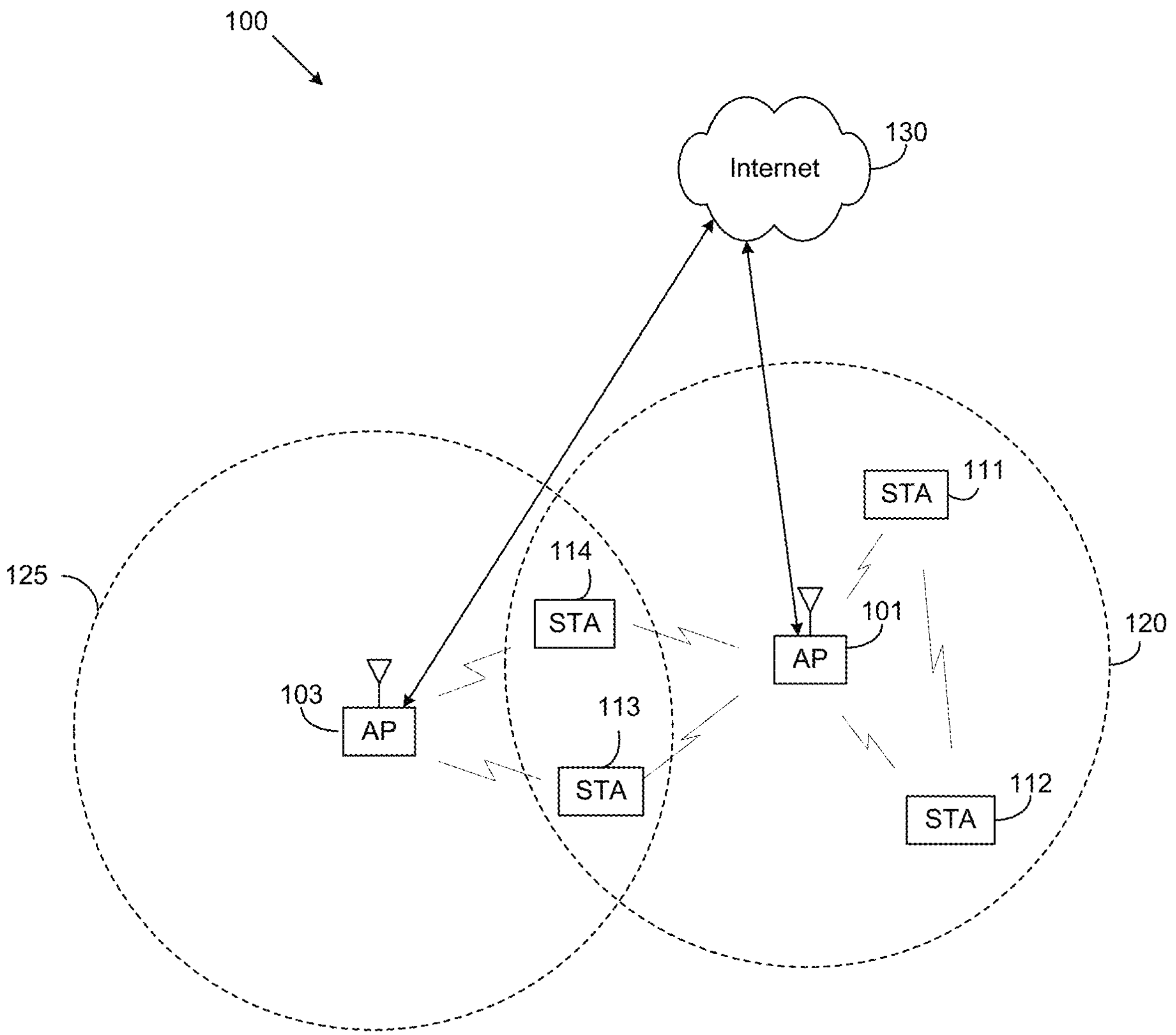
FIG. 1 illustrates an example wireless network according to various embodiments of the present disclosure.

FIG. 1 illustrates an example wireless network 100 according to various embodiments of the present disclosure. The embodiment of the wireless network 100 shown in FIG. 1 is for illustration only. Other embodiments of the wireless network 100 could be used without departing from the scope of this disclosure.

The wireless network 100 includes access points (APs) 101 and 103. The APs 101 and 103 communicate with at least one network 130, such as the Internet, a proprietary Internet Protocol (IP) network, or other data network. The AP 101 provides wireless access to the network 130 for a plurality of stations (STAs) 111-114 within a coverage area 120 of the AP 101. The APs 101-103 may communicate with each other and with the STAs 111-114 using Wi-Fi or other WLAN (wireless local area network) communication techniques. The STAs 111-114 may communicate with each other using peer-to-peer protocols, such as Tunneled Direct Link Setup (TDLS).

Depending on the network type, other well-known terms may be used instead of "access point" or "AP," such as "router" or "gateway." For the sake of convenience, the term "AP" is used in this disclosure to refer to network infrastructure components that provide wireless access to remote terminals. In WLAN, given that the AP also contends for the wireless channel, the AP may also be referred to as a STA. Also, depending on the network type, other well-known terms may be used instead of "station" or "STA," such as "mobile station," "subscriber station," "remote terminal," "user equipment," "wireless terminal," or "user device." For the sake of convenience, the terms "station" and "STA" are used in this disclosure to refer to remote wireless equipment that wirelessly accesses an AP or contends for a wireless channel in a WLAN, whether the STA is a mobile device (such as a mobile telephone or smartphone) or is normally considered a stationary device (such as a desktop computer, AP, media player, stationary sensor, television, etc.).

Dotted lines show the approximate extents of the coverage areas 120 and 125, which are shown as approximately circular for the purposes of illustration and explanation only. It should be clearly understood that the coverage areas associated with APs, such as the coverage areas 120 and 125, may have other shapes, including irregular shapes, depending upon the configuration of the APs and variations in the radio environment associated with natural and man-made obstructions.

As described in more detail below, one or more of the APs may include circuitry and/or programming to enable motion sensor fusion in indoor localization of an object. Although FIG. 1 illustrates one example of a wireless network 100, various changes may be made to FIG. 1. For example, the wireless network 100 could include any number of APs and any number of STAs in any suitable arrangement. Also, the AP 101 could communicate directly with any number of STAs and provide those STAs with wireless broadband access to the network 130. Similarly, each AP 101 and 103 could communicate directly with the network 130 and provide STAs with direct wireless broadband access to the network 130. Further, the APs 101 and/or 103 could provide access to other or additional external networks, such as external telephone networks or other types of data networks.

Figure 2A:
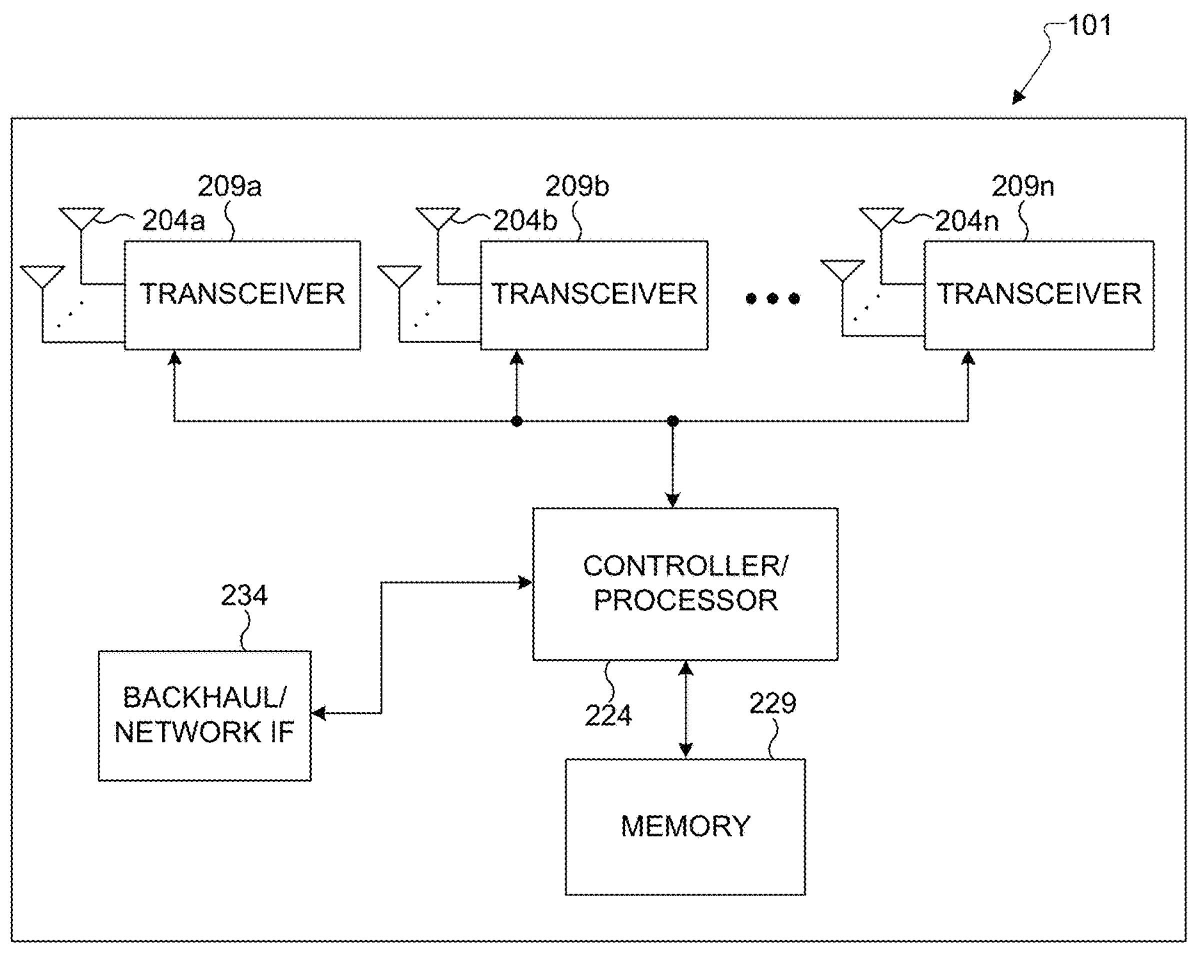
FIG. 2A illustrates an example AP according to various embodiments of the present disclosure.

FIG. 2A illustrates an example AP 101 according to various embodiments of the present disclosure. The embodiment of the AP 101 illustrated in FIG. 2A is for illustration only, and the AP 103 of FIG. 1 could have the same or similar configuration. However, APs come in a wide variety of configurations, and FIG. 2A does not limit the scope of this disclosure to any particular implementation of an AP.

The AP 101 includes multiple antennas 204*a*-204*n* and multiple transceivers 209*a*-209*n*. The AP 101 also includes a controller/processor 224, a memory 229, and a backhaul or network interface 234. The transceivers 209*a*-209*n* receive, from the antennas 204*a*-204*n*, incoming radio frequency (RF) signals, such as signals transmitted by STAs 111-114 in the network 100. The transceivers 209*a*-209*n* down-convert the incoming RF signals to generate IF or baseband signals. The IF or baseband signals are processed by receive (RX) processing circuitry in the transceivers 209*a*-209*n* and/or controller/processor 224, which generates processed baseband signals by filtering, decoding, and/or digitizing the baseband or IF signals. The controller/processor 224 may further process the baseband signals.

Transmit (TX) processing circuitry in the transceivers 209*a*-209*n* and/or controller/processor 224 receives analog or digital data (such as voice data, web data, e-mail, or interactive video game data) from the controller/processor 224. The TX processing circuitry encodes, multiplexes, and/or digitizes the outgoing baseband data to generate processed baseband or IF signals. The transceivers 209*a*-209*n* up-converts the baseband or IF signals to RF signals that are transmitted via the antennas 204*a*-204*n*.

The controller/processor 224 can include one or more processors or other processing devices that control the overall operation of the AP 101. For example, the controller/processor 224 could control the reception of forward channel signals and the transmission of reverse channel signals by the transceivers 209*a*-209*n* in accordance with well-known principles. The controller/processor 224 could support additional functions as well, such as more advanced wireless communication functions. For instance, the controller/processor 224 could support beam forming or directional routing operations in which outgoing signals from multiple antennas 204*a*-204*n* are weighted differently to effectively steer the outgoing signals in a desired direction. The controller/processor 224 could also support OFDMA operations in which outgoing signals are assigned to different subsets of subcarriers for different recipients (e.g., different STAs 111-114). Any of a wide variety of other functions could be supported in the AP 101 by the controller/processor 224 including motion sensor fusion in indoor localization of an object. In some embodiments, the controller/processor 224 includes at least one microprocessor or microcontroller. The controller/processor 224 is also capable of executing programs and other processes resident in the memory 229, such as an OS. The controller/processor 224 can move data into or out of the memory 229 as required by an executing process.

The controller/processor 224 is also coupled to the backhaul or network interface 234. The backhaul or network interface 234 allows the AP 101 to communicate with other devices or systems over a backhaul connection or over a network. The interface 234 could support communications over any suitable wired or wireless connection(s). For example, the interface 234 could allow the AP 101 to communicate over a wired or wireless local area network or over a wired or wireless connection to a larger network (such as the Internet). The interface 234 includes any suitable structure supporting communications over a wired or wireless connection, such as an Ethernet or RF transceiver. The memory 229 is coupled to the controller/processor 224. Part of the memory 229 could include a RAM, and another part of the memory 229 could include a Flash memory or other ROM.

As described in more detail below, the AP 101 may include circuitry and/or programming for motion sensor fusion in indoor localization of an object. Although FIG. 2A illustrates one example of AP 101, various changes may be made to FIG. 2A. For example, the AP 101 could include any number of each component shown in FIG. 2A. As a particular example, an access point could include a number of interfaces 234, and the controller/processor 224 could support routing functions to route data between different network addresses. Alternatively, only one antenna and transceiver path may be included, such as in legacy APs. Also, various components in FIG. 2A could be combined, further subdivided, or omitted and additional components could be added according to particular needs.

Figure 2B:
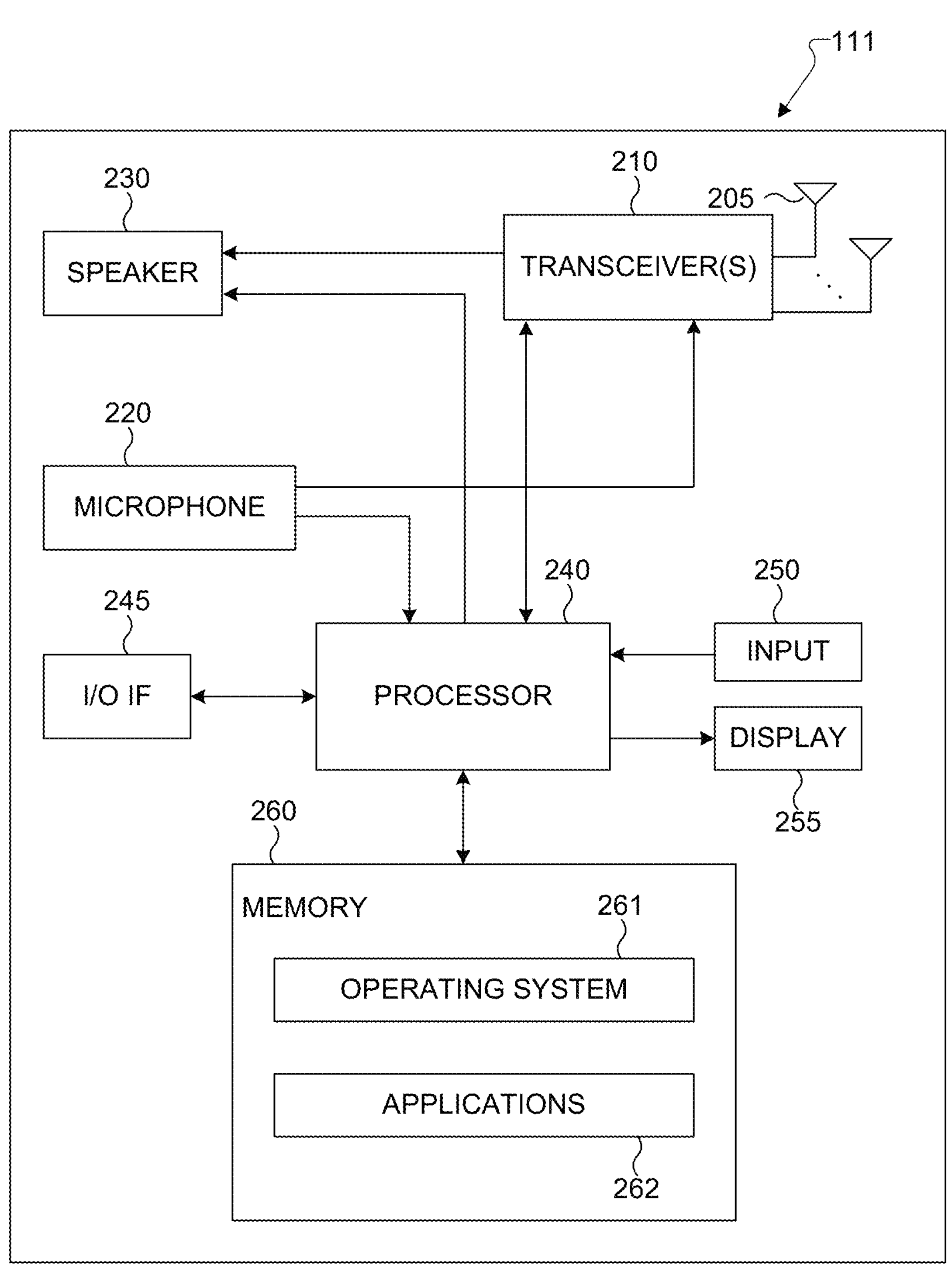
FIG. 2B illustrates an example STA according to various embodiments of the present disclosure.

FIG. 2B illustrates an example STA 111 according to various embodiments of the present disclosure. The embodiment of the STA 111 illustrated in FIG. 2B is for illustration only, and the STAs 112-114 of FIG. 1 could have the same or similar configuration. However, STAs come in a wide variety of configurations, and FIG. 2B does not limit the scope of this disclosure to any particular implementation of a STA.

The STA 111 includes antenna(s) 205, transceiver(s) 210, a microphone 220, a speaker 230, a processor 240, an input/output (I/O) interface (IF) 245, an input 250, a display 255, and a memory 260. The memory 260 includes an operating system (OS) 261 and one or more applications 262.

The transceiver(s) 210 receives from the antenna(s) 205, an incoming RF signal (e.g., transmitted by an AP 101 of the network 100). The transceiver(s) 210 down-converts the incoming RF signal to generate an intermediate frequency (IF) or baseband signal. The IF or baseband signal is processed by RX processing circuitry in the transceiver(s) 210 and/or processor 240, which generates a processed baseband signal by filtering, decoding, and/or digitizing the baseband or IF signal. The RX processing circuitry sends the processed baseband signal to the speaker 230 (such as for voice data) or is processed by the processor 240 (such as for web browsing data).

TX processing circuitry in the transceiver(s) 210 and/or processor 240 receives analog or digital voice data from the microphone 220 or other outgoing baseband data (such as web data, e-mail, or interactive video game data) from the processor 240. The TX processing circuitry encodes, multiplexes, and/or digitizes the outgoing baseband data to generate a processed baseband or IF signal. The transceiver(s) 210 up-converts the baseband or IF signal to an RF signal that is transmitted via the antenna(s) 205.

The processor 240 can include one or more processors and execute the basic OS program 261 stored in the memory 260 in order to control the overall operation of the STA 111. In one such operation, the processor 240 controls the reception of forward channel signals and the transmission of reverse channel signals by the transceiver(s) 210 in accordance with well-known principles. The processor 240 can also include processing circuitry configured to enable motion sensor fusion in indoor localization of an object. In some embodiments, the processor 240 includes at least one microprocessor or microcontroller.

The processor 240 is also capable of executing other processes and programs resident in the memory 260, such as operations for enabling motion sensor fusion in indoor localization of an object. The processor 240 can move data into or out of the memory 260 as required by an executing process. In some embodiments, the processor 240 is configured to execute a plurality of applications 262, such as applications to enable motion sensor fusion in indoor localization of an object. The processor 240 can operate the plurality of applications 262 based on the OS program 261 or in response to a signal received from an AP. The processor 240 is also coupled to the I/O interface 245, which provides STA 111 with the ability to connect to other devices such as laptop computers and handheld computers. The I/O interface 245 is the communication path between these accessories and the processor 240.

The processor 240 is also coupled to the input 250, which includes for example, a touchscreen, keypad, etc., and the display 255. The operator of the STA 111 can use the input 250 to enter data into the STA 111. The display 255 may be a liquid crystal display, light emitting diode display, or other display capable of rendering text and/or at least limited graphics, such as from web sites. The memory 260 is coupled to the processor 240. Part of the memory 260 could include a random-access memory (RAM), and another part of the memory 260 could include a Flash memory or other read-only memory (ROM).

Although FIG. 2B illustrates one example of STA 111, various changes may be made to FIG. 2B. For example, various components in FIG. 2B could be combined, further subdivided, or omitted and additional components could be added according to particular needs. In particular examples, the STA 111 may include any number of antenna(s) 205 for MIMO communication with an AP 101. In another example, the STA 111 may not include voice communication or the processor 240 could be divided into multiple processors, such as one or more central processing units (CPUs) and one or more graphics processing units (GPUs). Also, while FIG. 2B illustrates the STA 111 configured as a mobile telephone or smartphone, STAs could be configured to operate as other types of mobile or stationary devices.

As discussed earlier, while most of the existing indoor positioning techniques (e.g., Bluetooth and WiFi) suffer from poor accuracy, UWB can provide a robust and accurate indoor localization solution. UWB-based localization techniques generally use TWR or ToA. However, these techniques cannot cater to multiple users at the same time, hence are not very scalable. On the other hand, in DL-TDoA, the target does not directly communicate with the UWB anchors, but only listens to the downlink messages from the anchors. Hence, DL-TDoA not only serves multiple users at the same time, but also does not pose any privacy concerns.

DL-TDoA involves a downlink broadcast technology to position the target. The location of the target is calculated from the differences of arrival times measured on pairs of transmission paths between the target and anchors. The anchors are pre-installed and time synchronized and their locations are known to the target. The anchors send signals with timestamps to the target. The target uses the timestamps of the signals received from different anchors to calculate the time difference of arrival from different anchors.

Figure 3:
FIG. 3 illustrates an example network in which DL-TDoA can be performed according to various embodiments of the present disclosure.
Figure 3:
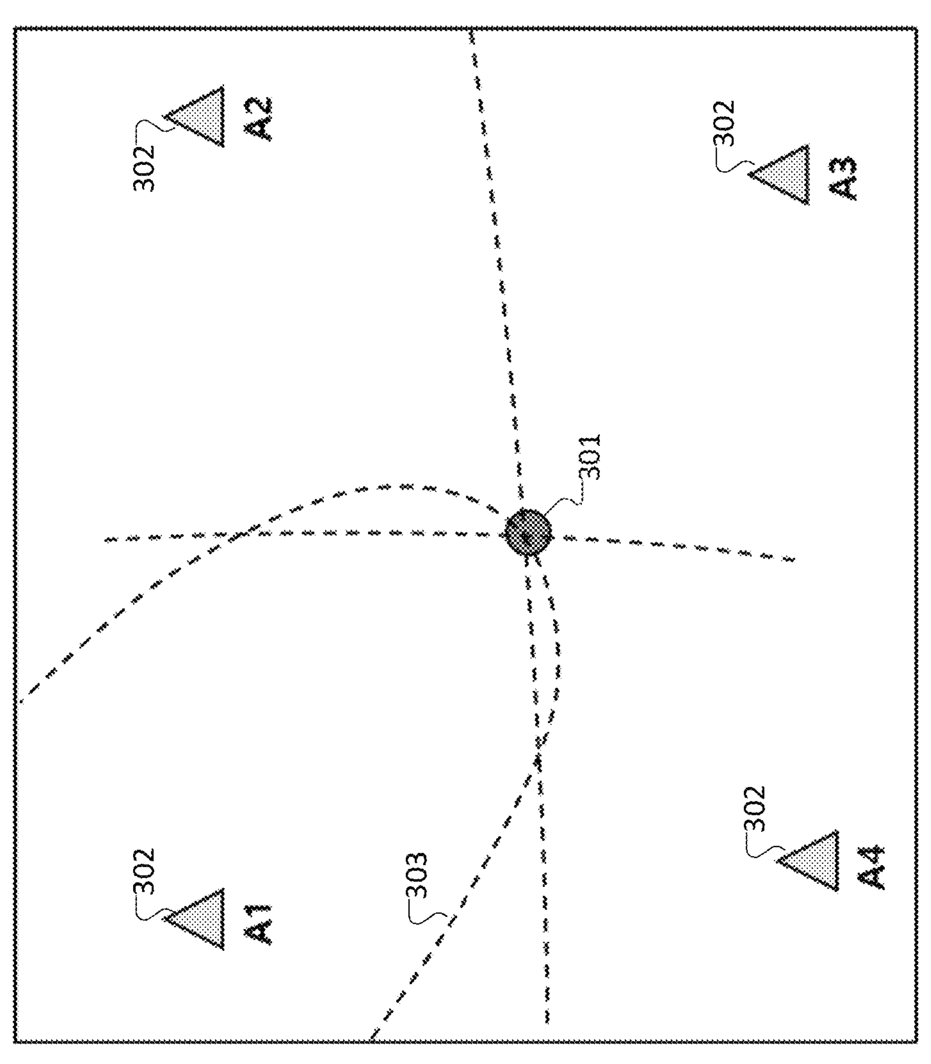

For example, FIG. 3 illustrates an example network 300 in which DL-TDoA can be performed according to various embodiments of the present disclosure. As shown in FIG. 3, the network 300 includes a target 301 disposed in proximity to multiple anchors 302. The target 301 and the anchors 302 could represent various components of the wireless network 100, such as the STA 111 and the AP 101. The location of the target 301 is calculated by determining the point of intersection of the hyperbolas 303 representing the distance differences (that is time difference of arrival multiplied by the speed of light). The target 301 uses measurements from at least four anchors 302 (three DL-TDoA measurements) to calculate its location. Note that the location of the target 301 is calculated at the target 301 itself. The advantage of this technique is that multiple targets 301 can listen to the downlink messages from the anchors 302, making the solution scalable.

Let the distance difference (obtained by multiplying the time difference of arrival with the speed of light) between anchors i and j be represented as $d_{ij}$. The value $d_{ij}$ is the difference between the distance of anchor i from the target 301 and the distance of anchor j from the target 301. If anchor k is the initiator or the reference anchor, a ranging round will involve obtaining the distance difference between all anchors 302 and anchor k. For example, if anchor Al is the reference anchor for the network 300, the measurements obtained in the ranging round will be $d_{21}$, $d_{31}$ and $d_{41}$. The location of the target 301 is the intersection point of the hyperbolas 303 representing these distance differences. The time between two ranging rounds is referred to as the ranging interval.

In practice, due to measurement errors, the hyperbolas 303 often do no intersect at a single point. Multipath also leads to huge errors in the measurements. Hence, an optimizer, for example least squares, Levenberg Marquardt (LM) or gradient descent algorithm, can be used to calculate the location of the target 301. However, these solutions need at least 3 UWB DL-TDoA measurements to localize the target 301. Hence, although UWB is capable of providing a highly accurate solution under controlled environments, in a more practical scenario, the quality and quantity of received measurements may be impacted by multipath and occlusion. Localization cannot be performed when there is complete absence of UWB measurements due to occlusion.

To address these and other issues, this disclosure provides systems and methods for motion sensor fusion in indoor localization of an object. As described in more detail below, the disclosed embodiments feature a motion sensor-assisted solution to perform robust and accurate indoor localization using UWB DL-TDoA measurements. That is, the disclosed embodiments combine UWB DL-TDoA measurements with motion sensor measurements to provide a UWB localization technique that is accurate (e.g., by also taking into account sensor information) and simultaneously robust to multipath and occlusion.

Note that while some of the embodiments discussed below are described in the context of smart phones, these are merely examples. It will be understood that the principles of this disclosure may be implemented in any number of other suitable contexts or systems, including other fixed or portable electronic devices (e.g., tablets, laptops, and the like).

Before describing the disclosed techniques in detail, it may be helpful to provide the following contextual information.

Pedestrian Dead Reckoning/Step and Heading System

Dead reckoning is a method of estimating the position of a moving object using the object's last known position and adding incremental displacements on top of that. Pedestrian dead reckoning, or PDR, refers specifically to the scenario where the object in question is a pedestrian walking in an indoor or outdoor space. With the proliferation of sensors inside smart devices (e.g., smartphones, tablets, smart watches, and the like), PDR has naturally matured to supplement wireless positioning technologies that have been long supported by these devices, such as Wi-Fi, cellular service, and UWB. The inertial measurement unit (IMU) is a device that combines numerous sensors with functional differences. For example, the accelerometer measures linear acceleration, the gyroscope measures angular velocity, and the magnetometer measures the strength and direction of the magnetic field. These three sensors can detect motion and estimate its velocity, i.e., speed and heading. PDR is also referred to as the Step and Heading (SH) system.

Extended Kalman Filter

A Kalman filter recursively estimates the state of a dynamical system from a sequence of measurements obtained over time and an assumption of state trajectory. It assumes an underlying system that is modeled by two linear equations: a state transition/motion equation and a measurement/observation equation. The motion equation describes the evolution of the state of the system and relates the current state to a previous state as follows:

$$x_k = A_k x_{k-1} + B_k u_k + v_k$$

where $x_k$ is the current state, $x_{k-1}$ is the last state, $A_k$ is the state transition matrix, $u_k$ is the current input, $B_k$ is the control/input matrix, and $v_k \sim N(0,Q_k)$ is the process noise which represents uncertainty in state.

The measurement equation relates the current observation to the current state as follows:

$$y_k = H_k x_k + w_k$$

where $y_k$ is the latest observation, $H_k$ is the observation matrix, and $w_k \sim N(0,R_k)$ is the observation noise.

At each time index k, the Kalman filter estimates the state of the system by applying a prediction step followed by an update step. The outcome of these two steps is the state estimate $\hat{x}_k$ at time index k and its covariance matrix $P_k$, which are in turn used to estimate the states at later points in time.

In the prediction step, the Kalman filter predicts the current state $x_{k|k-1}$ (a priori estimate) from the most recent state estimate $\hat{x}_{k-1}$, its covariance $P_{k-1}$, and any inputs using the motion equation as follows:

$$\hat{x}_{k|k-1} = A_k \hat{x}_{k-1} + B_k u_k$$

$$P_{k|k-1} = A_k P_k A_k^* + Q_k.$$

In the update step, the Kalman filter uses the latest observation to update its prediction and obtain the (a posteriori) state estimate $\hat{x}_k$ and its covariance $P_k$ as follows:

$$\hat{x}_k = \hat{x}_{k|k-1} + K_k\left(y_k - H_k \hat{x}_{k|k-1}\right)$$

$$P_k = (I - K_k H_k) P_{k|k-1}$$

where $K_k$ is the Kalman gain and is a function of the a priori estimate covariance $P_{k|k-1}$, observation matrix $H_k$, and observation noise covariance matrix $R_k$.

The extended Kalman filter (EKF) is a work-around to handle non-linearities in the motion or measurement models. If the motion or measurement equations are not linear, the Kalman filter could not be used unless these equations are linearized. Consider the following non-linear motion and measurement equations:

$$x_k = f_k(x_{k-1}, u_k) + v_k$$

$$y_k = h_k(x_k) + w_k$$

where $f_k$ and $h_k$ are non-linear functions. The EKF applies the predict and update steps as follows:

For the EKF, the prediction step includes the following:

$$\hat{x}_{k|k-1} = f_k(\hat{x}_{k-1}, u_k)$$

$$P_{k|k-1} = F_k P_k F_k^* + Q_k$$

where $$F_k = \frac{\partial f_k(x, u)}{\partial x}\Big|_{x=\hat{x}_{k-1}, u=u_k}.$$

For the EKF, the update step includes the following:

$$\hat{x}_k = \hat{x}_{k|k-1} + K_k\left(y_k - H_k \hat{x}_{k|k-1}\right)$$

$$P_k = (I - K_k H_k) P_{k|k-1}$$

where $$H_k = \frac{\partial h_k(x)}{\partial x}\Big|_{x=\hat{x}_{k-1}}.$$

The state estimate $\hat{x}_k$ and its covariance $P_k$ are propagated to track the state of system.

In the context of localization, the state is the target 2D location. In the context of UWB DL-TDoA based indoor localization, the observations are UWB distance difference measurements, which are calculated from TDoA measurements by multiplying it with the speed of light.

Figure 4:
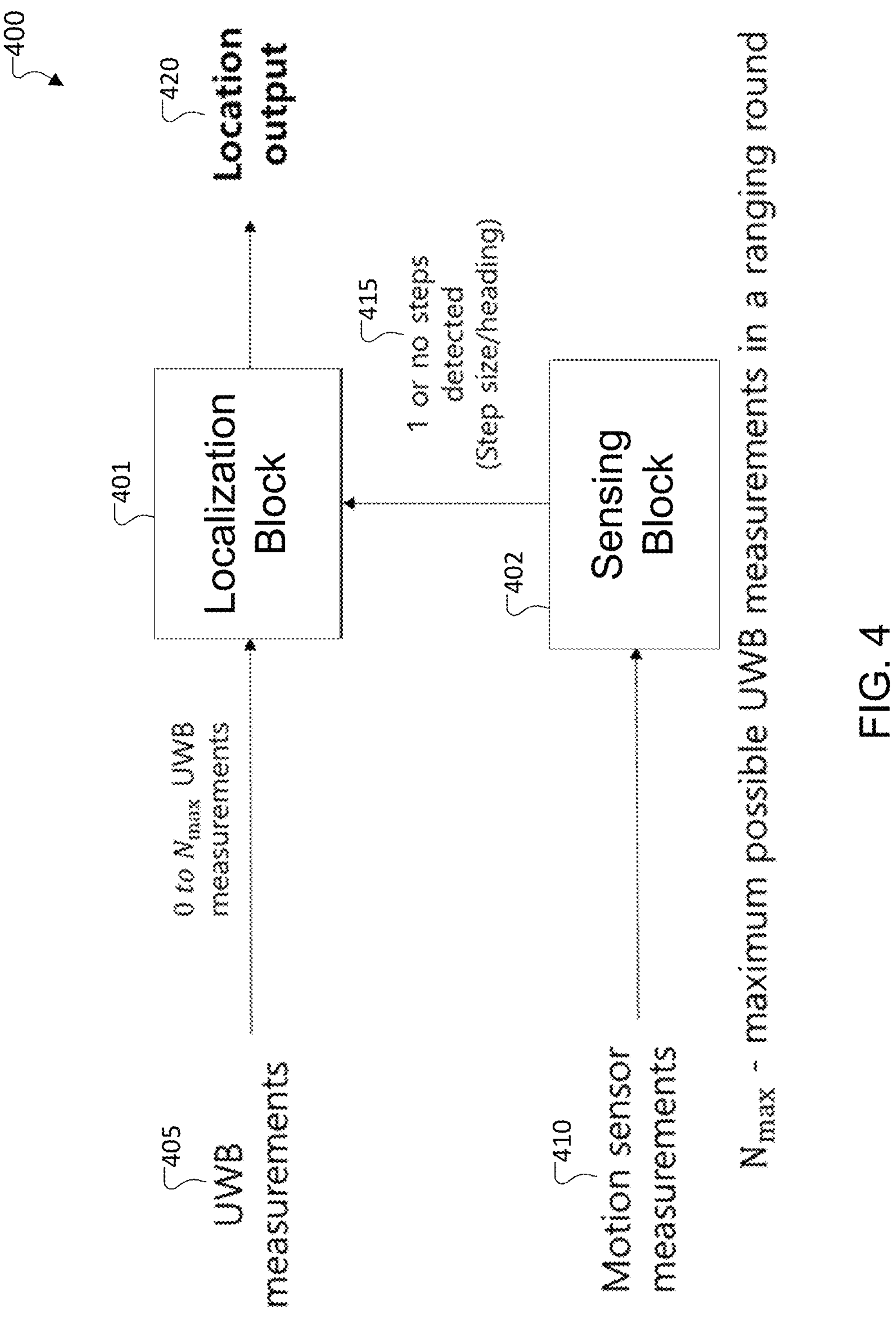
FIG. 4 illustrates an example system for performing indoor localization according to various embodiments of the present disclosure.

FIG. 4 illustrates an example system 400 for performing indoor localization according to various embodiments of the present disclosure. The system 400 includes a background tracking filter to infer step heading and displacement within a time window when UWB measurements are present. The system 400 can perform online heading calibration to find an offset in step heading obtained from sensor readings. In addition, the system 400 can perform online step size parameter calibration to find the parameter value to calculate step length or size. The embodiment of the system 400 shown in FIG. 4 is for illustration only. Other embodiments of the system 400 could be used without departing from the scope of this disclosure. For ease of explanation, the system 400 will be described as being implemented in the network 300 of FIG. 3, such as in the target 301. However, the system 400 could be implemented in any other suitable device(s) or system(s).

As shown in FIG. 4, the system 400 includes a localization block 401 and a sensing block 402. The localization block 401 receives UWB measurements 405 from one or more anchors 302. In some embodiments, the UWB measurements 405 include UWB DL-TDoA measurements. If the localization block 401 receives a sufficient number (e.g., at least three) of UWB DL-TDoA measurements, the localization block 401 uses an optimizer along with a tracking filter, or a tracking filter alone, to track the location 420 of the target 301. However, it is possible to encounter cases where no UWB measurements 405 are received by the localization block 401, either due to occlusion or due to the target 301 leaving the coverage area of the anchors 302. In such cases, the state of the tracking filter is not updated.

It is also possible that the UWB measurements 405 received by the localization block 401 are of poor quality, possibly impacted by multipath. In such scenarios, the tracking filter may not generate the correct output. In order to deal with scenarios of no UWB measurements 405 or poor quality UWB measurements 405, the localization block 401 uses information from the sensing block 402 to track the target 301.

The localization block 401 takes the UWB measurements 405 and step information 415 from the sensing block 402 as input to obtain the location output 420. The localization block 401 can use a tracking filter or an optimizer and tracking filter to fuse the UWB measurements 405 and sensor data to localize the target 301. Some examples of optimizers that can be used to localize the target 301 based on UWB measurements 405 include least square, Levenberg Marquardt (LM), and gradient descent algorithm. A tracking filter (for example, an Extended Kalman Filter (EKF) or particle filter) can be used to fuse UWB measurements 405 and sensor data to localize the target 301.

The sensing block 402 uses motion sensor measurements 410 to detect steps as the user walks. The length/size and direction/heading of the steps are calculated using these measurements and, given the current location of the target 301, they are used to calculate its next location.

Figure 5:
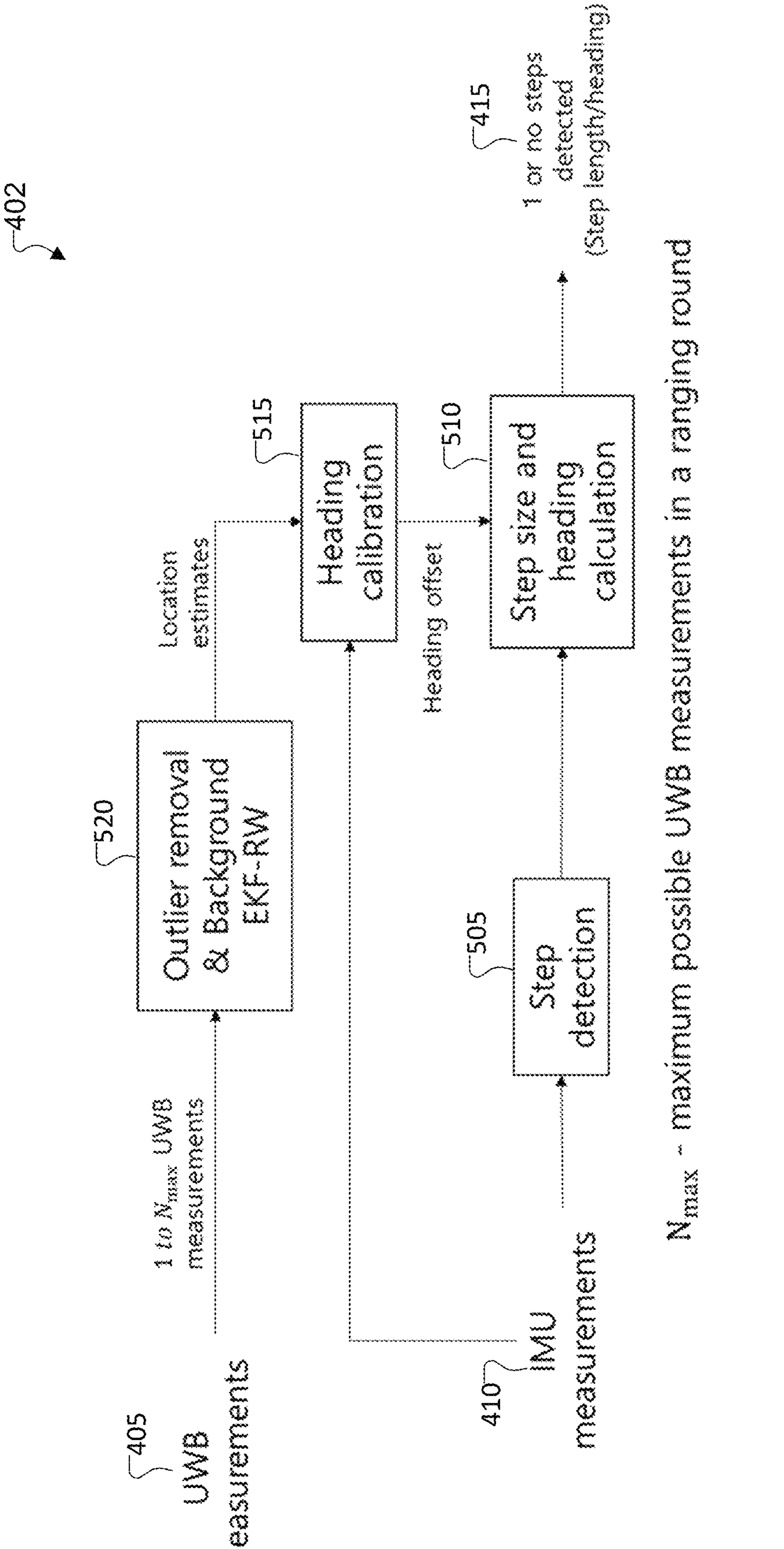
FIG. 5 illustrates further details of an example sensing block used in the system of FIG. 4 according to various embodiments of the present disclosure.
Figures 6A, 6B:
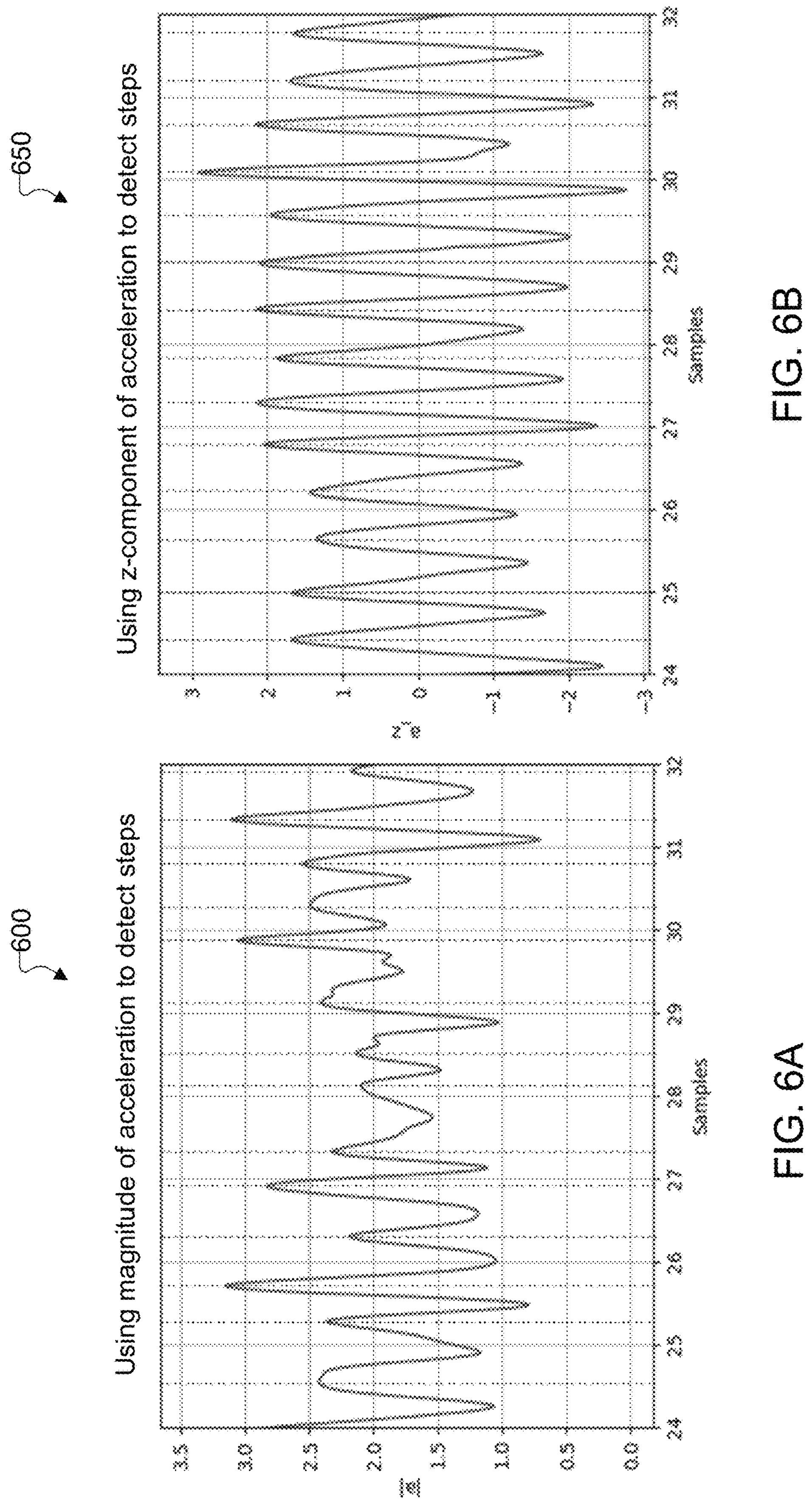
FIGS. 6A and 6B illustrate charts showing example linear acceleration information that can be used for step detection according to various embodiments of the present disclosure.
Figure 7:
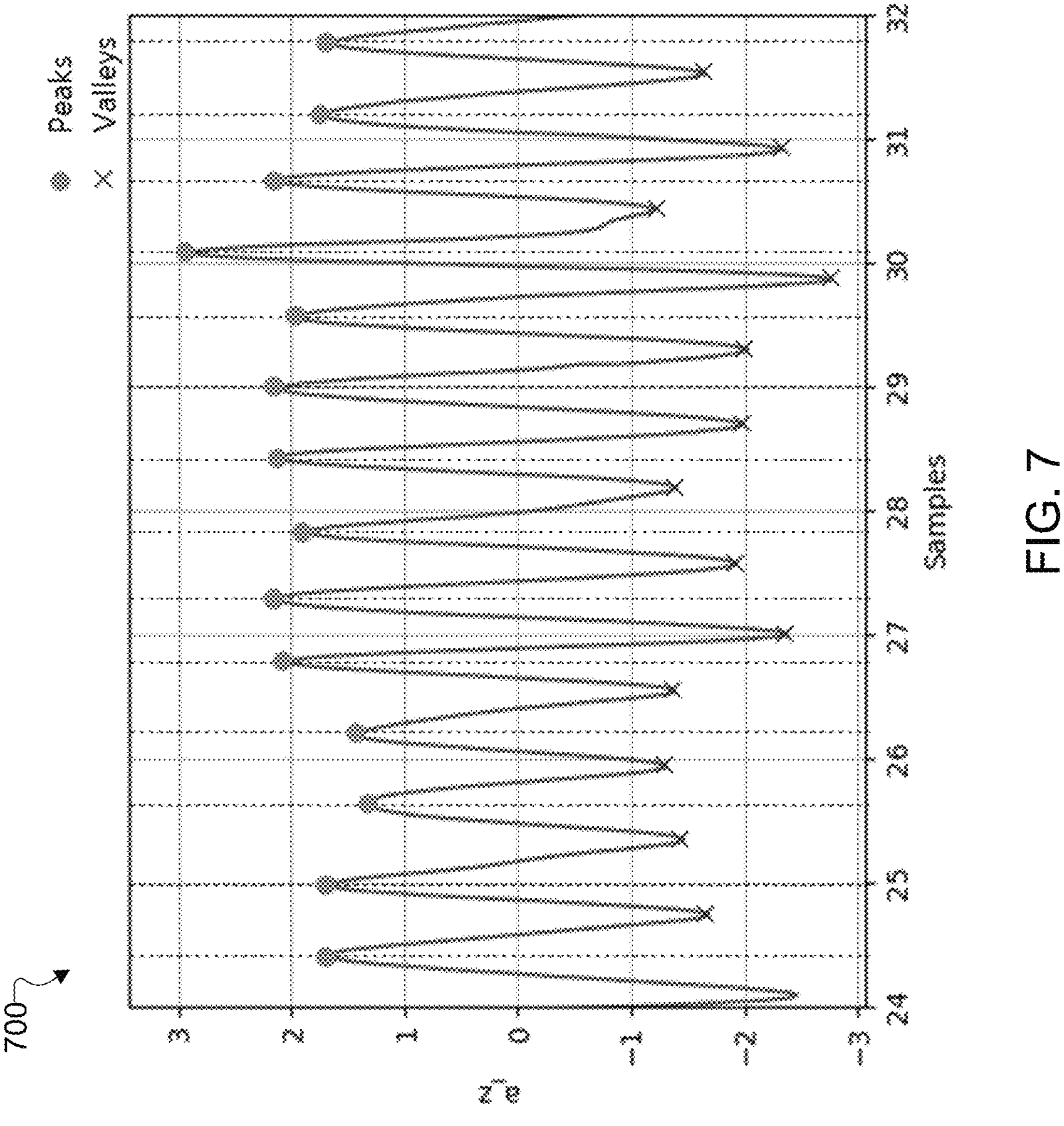
FIG. 7 illustrates an example chart showing peaks and valleys in the z component of acceleration according to various embodiments of the present disclosure.

FIG. 5 illustrates further details of an example sensing block 402 according to various embodiments of the present disclosure. As shown in FIG. 5, the sensing block 402 takes the motion sensor measurements 410 (which can be IMU measurements) as input to a step detection operation 505, which is performed to detect a user step. In some embodiments, the step detection operation 505 uses linear acceleration information obtained from the motion sensor measurements 410. FIGS. 6A and 6B illustrate charts 600 and 650 showing example linear acceleration information that can be used for step detection according to various embodiments of the present disclosure. Every time a peak in the linear acceleration is detected by an IMU accelerometer, as shown by the dotted vertical lines in FIGS. 6A and 6B, a step is signaled. In some embodiments, the magnitude of linear acceleration is used for peak detection, such as shown in FIG. 6A. In other embodiments, a particular component of the linear acceleration (e.g., the z-component, such as shown in FIG. 6B) is used depending on the way the target 301 is held.

Whenever a step is detected, the sensing block 402 performs a step size and heading calculation 510 to calculate the size of the step and its heading. The output of the step size and heading calculation 510 is the step information 415, which can be provided to the localization block 401.

In the step size and heading calculation 510, the step size $s_n$ can be computed according to the Weinberg model as follows:

$$s_n = \alpha \cdot \sqrt[4]{a_{max} - a_{min}} \quad (1)$$

where $a_{max}$ and $a_{min}$ are the maximum and minimum acceleration since the last peak was detected, and $\alpha \in [0, 1]$ is a user-dependent scaling coefficient referred to as the Weinberg parameter or the step size parameter. The parameters $a_{max}$ and $a_{min}$ are obtained by finding the peaks and valleys in the acceleration as shown in the example chart 700 of FIG. 7. In some embodiments, a fixed value for the step size parameter (e.g., $\alpha$=0.4) based on experimentation is used. In other embodiments, other ways of computing the step size $s_n$ include Kim's model, which uses the average of acceleration in each step to compute step size, and Scarlet model, which is an empirical model.

In the step size and heading calculation 510, the step heading can be obtained using the motion sensor provided orientation, which is computed using linear acceleration and magnetometer readings, or it can be obtained using gyroscope readings.

In some embodiments, gyroscope readings are integrated to obtain the step heading. The heading is initialized with orientation from the motion sensor at the start of the trajectory. If $\hat{\theta}_n$ is the heading at step n, it is calculated as:

$$\hat{\theta}_n = \hat{\theta}_{n-1} + \sum_{t \in t_{s_n}} \omega_t \Delta t \quad (2)$$

where $t_{s_n}$ represents the duration of $n^{th}$ step. The angular velocity obtained over the duration of the step is integrated and added to the heading at the time of the previous step to obtain the current heading. In some embodiments, tilt compensation is applied to the angular velocity using rotation quaternions before integrating it to obtain the heading.

In some embodiments, orientation $\phi$ obtained directly from the motion sensor is used to calculate the step heading using the following equation:

$$\hat{\theta}_n = \bar{\phi}_n \quad (3)$$

where $\bar{\phi}_n$ is the average orientation over the duration of $n^{th}$ step.

The sensing block 402 can also perform an online heading calibration 515, in which the sensing block 402 calculates an offset in step heading obtained from sensor readings. As discussed above, the step heading can be obtained from IMU orientation and gyroscope readings. However, there could be some offsets in the step heading compared to the true heading. It is therefore helpful or necessary to calibrate the offset since the localization block 401 is driven by step size and heading when UWB measurements are lost. Further details of the heading calibration 515 are provided below.

In some embodiments, a background random walk EKF (EKF-RW) 520 is used along with the sensor readings to calculate the heading offset online. The background EKF-RW 520 uses UWB measurements 405, whenever they are available, to generate location estimates. The background EKF-RW 520 will now be explained in greater detail.

Background EKF-RW 520.

A random walk EKF estimates the state $x_k=[x_k\ y_k]^T$ by using a motion model given as:

$$x_k = x_{k-1} + v_k \tag{4}$$

where $(x_k > y_k)$ represents the 2D location of the target 301 and $x_{k-1}$ is the previous state of the EKF representing the previous 2D location of the target 301. The term $v_k \sim N(0,Q_k)$ represents the process noise, which can be given by the following:

$$Q_k = \begin{bmatrix} \sigma_P^2 \Delta t^2 & 0 \\ 0 & \sigma_P^2 \Delta t^2 \end{bmatrix} \tag{5}$$

where $\Delta t = t_k - t_{k-1}$ is the time difference between consecutive steps and op is the variance in the speed of the target 301.

The measurement model maps the current UWB measurements 405, which can include the distance difference measurements ($d_{ij}$) from anchor pair i and j (among the anchors 302), to the current state using the measurement equation:

$$d_{ij} = d(x_k, x_i, x_j) + w_k \tag{6}$$

Here, $d_{ij}$ represents the difference in distance di of the target 301 from anchor i and its distance $d_j$ from the anchor j. The term $d_{ij}$ is a measurement obtained by multiplying the TDoA from anchors i and j with the speed of light. In Equation (6), $x_i$ and $x_j$ represent the 2D location of the anchors i and j, respectively, and $w_k \sim (\mu_k, R_k)$ represents the measurement noise.

Considering a fixed value $h_A$ for the height of the anchors i and j and approximate value $h_T$ for the height of the target 301, the mapping between the state and measurements is given as:

$$d(x_k, x_i, x_j) = d_i - d_j = \sqrt{(x_k - x_i)^2 + (y_k - y_i)^2 + (h_T - h_A)^2} - \sqrt{(x_k - x_j)^2 + (y_k - y_j)^2 + (h_T - h_A)^2} \tag{7}$$

Equation (6) is linearized into the following equation:

$$y_k = H_k x_k + w_k \tag{8}$$

where $y_k$ is a vector of measurements $d_{ij}$ available from different pairs of anchors 302, and $H_k$ is the Jacobian matrix obtained by taking the partial derivative of $d_{ij}$ with the state vector. The row vector of $H_k$ corresponding to the measurement $d_{ij}$ is given as:

$$\left[\frac{x_k - x_i}{d_i} - \frac{x_k - x_j}{d_j}\ \frac{y_k - y_i}{d_i} - \frac{y_k - y_j}{d_j}\right].$$

The state of the background EKF-RW 520 is updated every time UWB measurements 405 are received. The state remains the same if no measurements are received.

In order to improve the accuracy of state estimation, outlier removal is performed on the UWB measurements 405 before they are used by the background EKF-RW 520. Outlier removal is performed in between the prediction and update steps of EKF-RW. To perform outlier removal, first the prediction step of the tracking filter is executed to obtain an initial location estimate of the next location of the target 301. An estimate of distance difference measurements is calculated at the predicted location, and these are compared against the measured distance difference measurements. If the absolute difference between an estimated and measured distance difference measurement lies above a threshold, the distance difference measurement is labeled as an outlier and is not used in the update step of tracking filter.

Heading Calibration 515.

As discussed above, the heading offset should be calibrated since the localization block 401 is driven by step size and heading when UWB measurements are lost. The value of step heading is obtained as:

$$\theta = \hat{\theta} + \Delta\theta \tag{9}$$

where $\Delta\theta$ is the offset in the heading, that is the difference between the calculated heading and true heading.

As described above, the sensing block 402 can use the background EKF-RW 520 to compute the heading offset. The background EKF-RW 520 runs whenever good UWB measurements 405 are available. Hence, the assumption here is that the sensing block 402 starts the trajectory estimation from a good measurement zone. A set of conditions are used to trigger the heading calibration 515. These conditions include (i) whether the target 301 is moving in a straight line based on the motion sensor measurements 410, (ii) whether there are a sufficient number of UWB measurements 405 satisfying a condition (e.g., good UWB measurements 405), and (iii) whether the target 301 is in motion based on displacement data. When all of these conditions are satisfied, the heading calibration 515 is triggered and the heading offset is computed. When the heading calibration 515 is triggered, the estimated heading is obtained from the location estimates obtained from the background EKF-RW 520 in the straight-line window. This estimated heading is compared to the heading information obtained from the motion sensor measurements 410 to calculate the heading offset.

Figure 8:
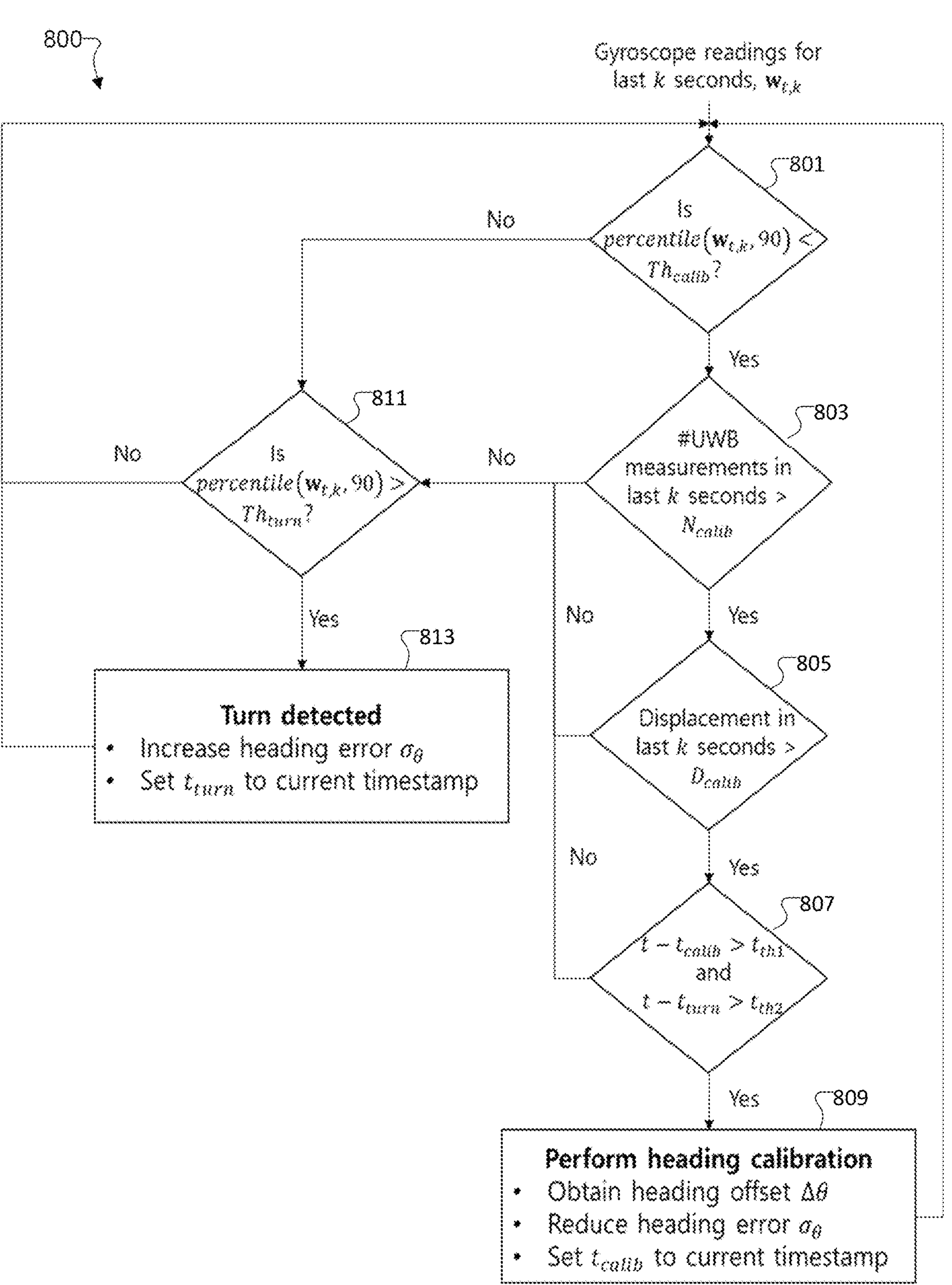
FIGS. 8 through 10 illustrate example processes that can be performed in a heading calibration according to various embodiments of the present disclosure.

FIG. 8 illustrates an example process 800 that can be performed in the heading calibration 515 according to various embodiments of the present disclosure. As shown in FIG. 8, the process 800 starts with the sensing block 402 initializing parameters $t_{turn}$ and $t_{calib}$ with the initial timestamp at the start of the trajectory. The parameter $t_{turn}$ refers to the timestamp of the last turn made, and the parameter $t_{calib}$ refers to the timestamp of when the last time heading calibration was performed.

At operation 801, the sensing block 402 checks for a straight-line motion by checking the gyroscope readings for last k seconds (e.g., k=5). The angular velocity obtained from the gyroscope is expected to be low in a straight line motion, hence the check for straight line is done by checking if a predetermined percentile (e.g., the 90th percentile) of gyroscope readings is less than a predetermined threshold value $Th_{calib}$ (e.g., 30°). At operation 803, the sensing block 402 checks if there are a sufficient number of UWB measurements 405 (threshold=$N_{calib}$) received in the last k seconds. At operation 805, the sensing block 402 checks if there is non-zero motion in last k seconds by checking the displacement (threshold=$D_{calib}$) based on background EKF-RW in the last k seconds. At operation 807, the sensing block 402 checks if sufficient time has elapsed since the last calibration was done and last turn was made. This is checked by comparing the difference between the current timestamp and $t_{calib}$ and $t_{turn}$ with thresholds $t_{th1}$ and $t_{th2}$, respectively. If all these conditions are satisfied, then heading calibration is triggered, as shown at operation 809. The heading offset is obtained by subtracting the implied heading $\hat{\theta}_{RW}$ (computed through linear regression of background EKF-RW estimates $\{x_k\}$ in the last k seconds) with the heading obtained from integrated gyroscope readings, as given by the following equation:

$$\Delta\theta = \hat{\theta}_{RW} - \hat{\theta} \tag{10}$$

In parallel, at operation 811, the sensing block 402 checks another condition to detect a turn. This condition is checking if the 90th percentile of gyroscope readings is above a threshold $Th_{turn}$. If so, then a turn is detected, as indicated at operation 813. The heading calibration 515 is continuously performed throughout the course of the trajectory whenever the trigger conditions are satisfied.

Figure 9:
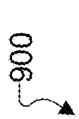
Figure 9:
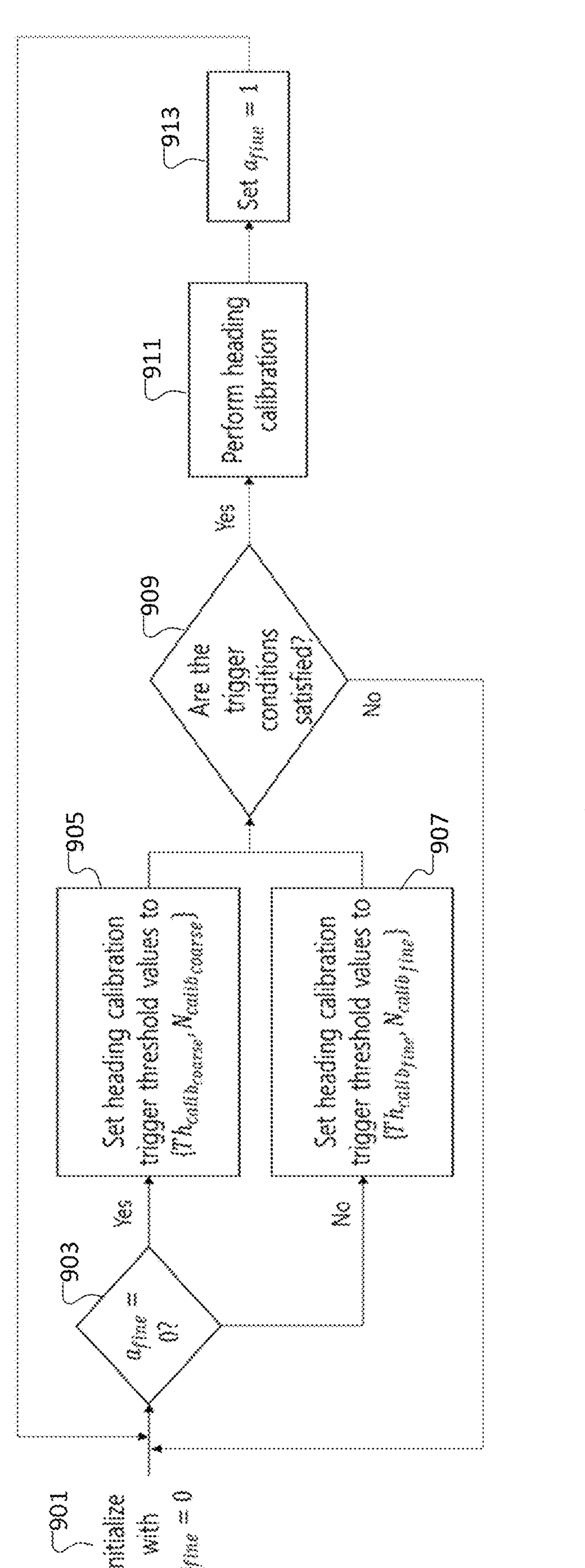

FIG. 9 illustrates another example process 900 that can be performed in the heading calibration 515 according to various embodiments of the present disclosure. As shown in FIG. 9, the process 900 is performed as a two-step calibration that includes coarse calibration and fine calibration. At operation 901, the parameter $a_{fine}$ is initialized to zero. This is a parameter to ensure that coarse calibration is performed only once. The coarse calibration is only performed once as the first calibration during the course of trajectory estimation. The trigger conditions for coarse calibration are relaxed, that is $Th_{calib}$ is a bigger value and $N_{calib}$ is smaller. The purpose of the coarse calibration is to have an estimate of the heading offset even if the stricter trigger conditions of fine calibration are not met during the entire course of the trajectory. At operation 903, the sensing block 402 determines if $a_{fine}$ is equal to zero. If so, then at operation 905, the sensing block 402 sets the trigger thresholds for coarse calibration to be $\{Th_{calib_{coarse}}, N_{calib_{coarse}}\}$. If not, then at operation 907, the sensing block 402 sets the trigger thresholds for fine calibration to be $\{Th_{calib_{fine}}, N_{calib_{fine}}\}$.

At operation 909, the sensing block 402 determines if the trigger conditions (either the coarse trigger thresholds or the fine trigger thresholds) are met. If the trigger conditions are met, then at operation 911, the sensing block 402 performs the heading calibration (either the coarse calibration or the fine calibration, according to the threshold values set in operation 905 or 907). Once the coarse calibration is performed, the sensing block 402 sets the parameter $a_{fine}$ to be equal to one at operation 913. This ensures that the sensing block 402 does not enter this coarse calibration state again. Whenever the stricter trigger conditions are met, the fine calibration is performed along the remaining course of the trajectory.

Figure 10:
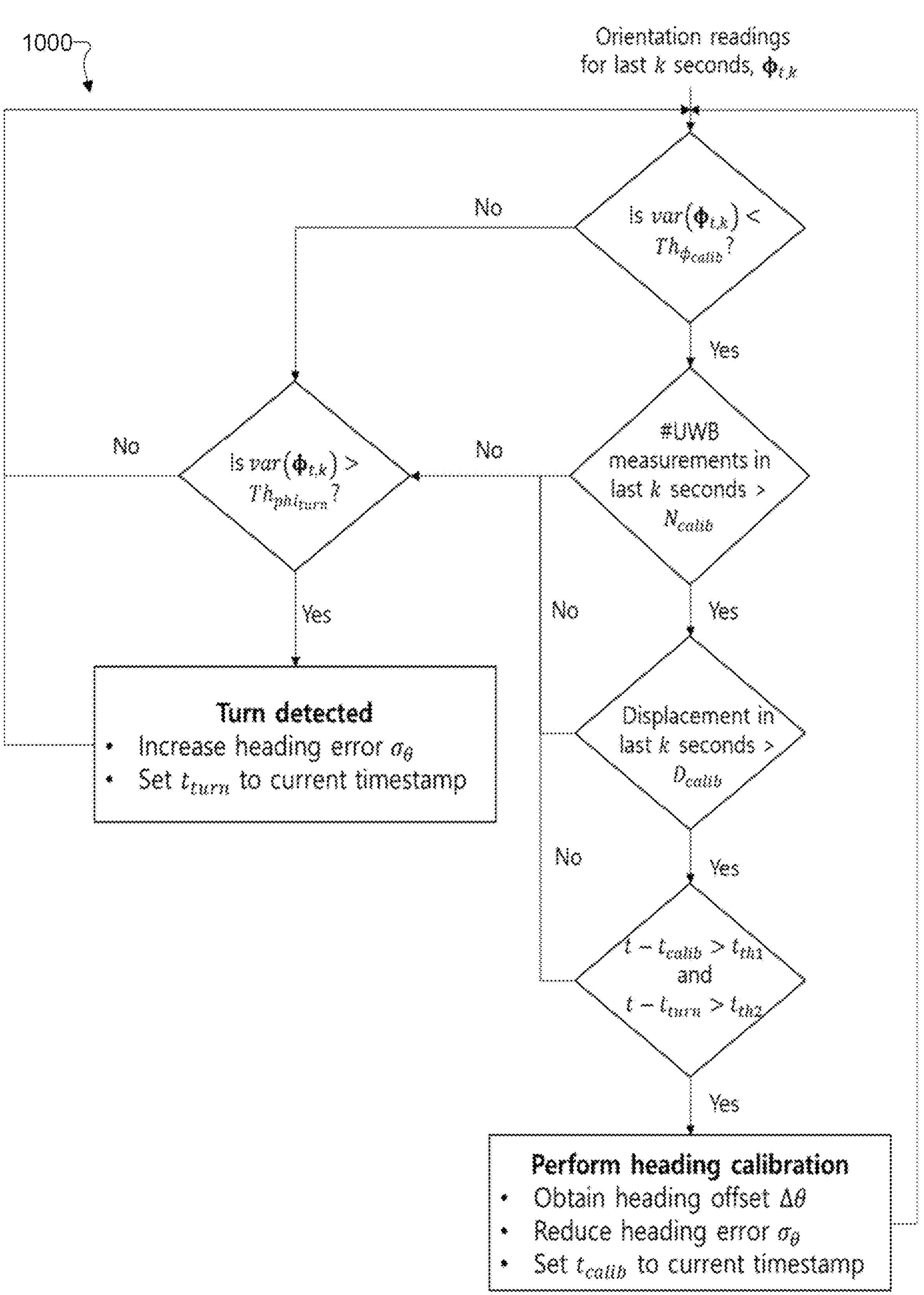

FIG. 10 illustrates yet another example process 1000 that can be performed in the heading calibration 515 according to various embodiments of the present disclosure. As shown in FIG. 10, the process 1000 is substantially similar to the process 800 of FIG. 8, except that orientation information obtained directly from the motion sensor is used to calculate the heading, rather than gyroscope readings. In the process 1000, straight-line motions are detected by comparing the variance of orientation in a prior time period (e.g., the last k seconds) against a threshold $Th_{\phi_{calib}}$. Similarly, turns are detected by comparing the variance of orientation in the last k seconds against another threshold $Th_{\phi_{turn}}$.

Figure 11:
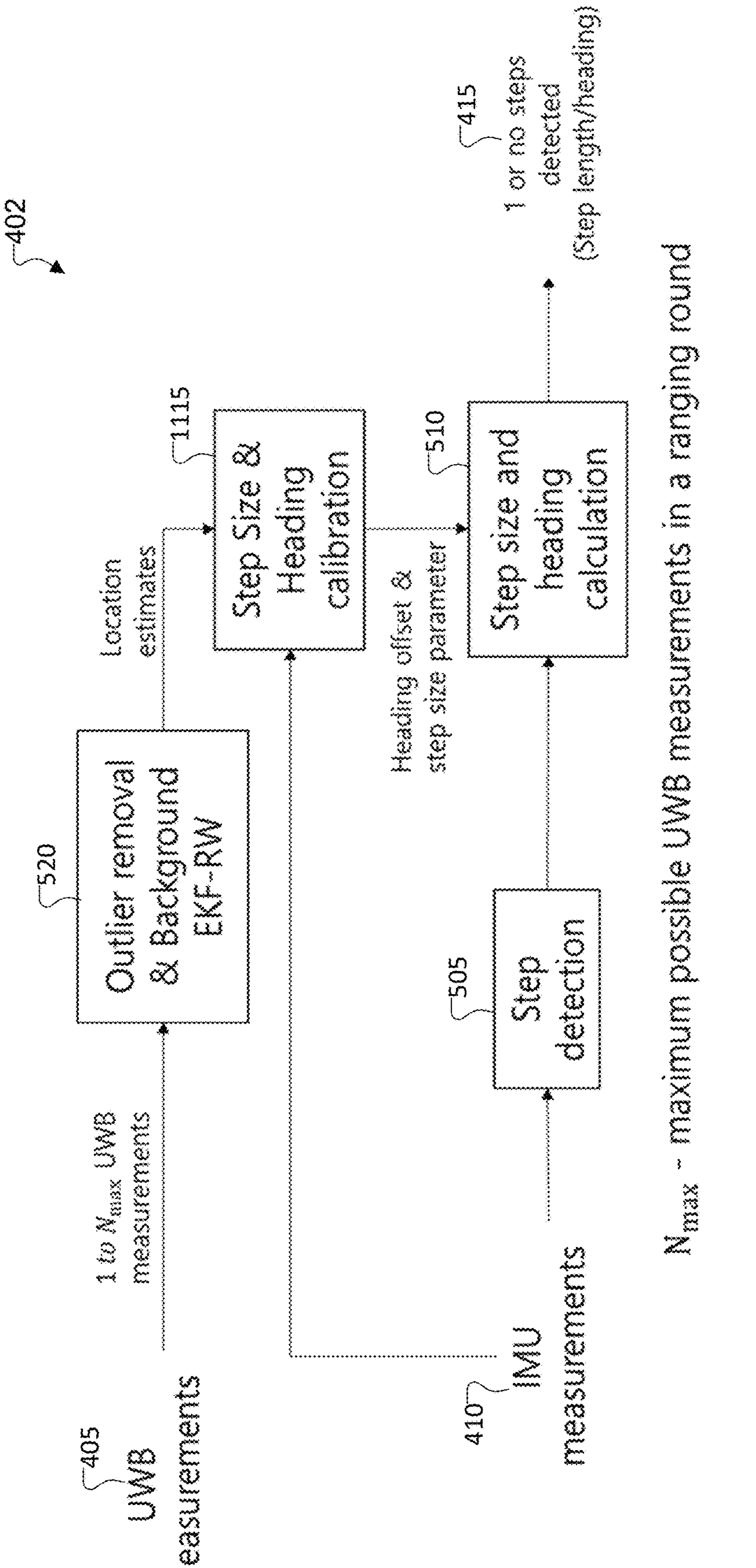
FIG. 11 illustrates further details of another example sensing block used in the system of FIG. 4 according to various embodiments of the present disclosure.

FIG. 11 illustrates further details of another example sensing block 402 according to various embodiments of the present disclosure. As shown in FIG. 11, the sensing block 402 performs both heading and step size parameter calibration. That is, instead of just the heading calibration 515 (as in FIG. 5), here the sensing block 402 performs a step size and heading calibration 1115.

The step size and heading calibration 1115 includes the techniques of the heading calibration 515, and also includes a step size parameter calibration. The step size parameter calibration is performed using the same trigger conditions as the heading calibration. Step calibration is also performed looking at background EKF-RW estimates $\{x_k\}$ in the last k seconds. For every step detected in the last k seconds, the total displacement d during the step duration is obtained using the estimates of background EKF-RW, such as by the following.

$$d = \sum\nolimits_{t \in t_{s_n}} \|\hat{x}_t - \hat{x}_{t-1}\| \tag{11}$$

where $t_{s_n}$ is the duration of $n^{th}$ step and $\hat{x}_t$ is the estimate of background EKF-RW at time t.

If $a_0$ is the original set value of the step size parameter, the updated step size parameter value based on step n is obtained as:

$$\hat{\alpha}_n = \frac{d}{s_n / a_0} \tag{12}$$

where $s_n$ is the size of $n^{th}$ step.

An updated $\hat{\alpha}$ is calculated for each step in the last k seconds. The updated value of step size parameter ($\alpha_{updated}$) is obtained by taking the average of all $\hat{\alpha}$ corresponding to the steps in last k seconds.

In some embodiments, step size parameter calibration is performed once during the course of the trajectory. In other embodiments, step size parameter calibration can be performed every time the trigger conditions for calibration are met.

Although FIGS. 3 through 11 illustrate example techniques for motion sensor fusion in indoor localization of an object and related details, various changes may be made to FIGS. 3 through 11. For example, various components in FIGS. 3 through 11 could be combined, further subdivided, or omitted and additional components could be added according to particular needs. In addition, while shown as a series of steps, various operations in FIGS. 3 through 11 could overlap, occur in parallel, occur in a different order, or occur any number of times. In another example, steps may be omitted or replaced by other steps.

Figure 12:
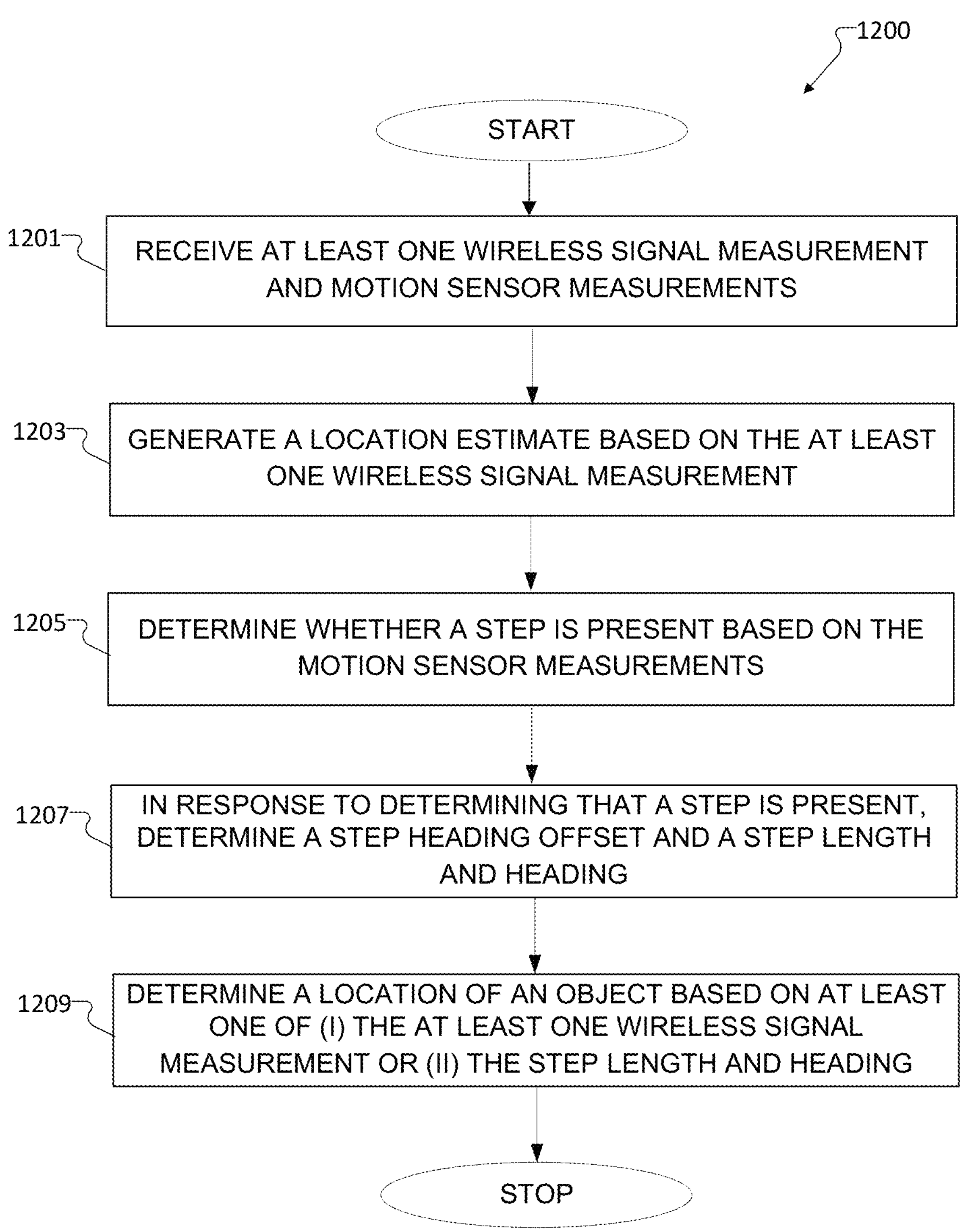
FIG. 12 illustrates a flowchart of a method for motion sensor fusion in indoor localization of an object according to various embodiments of the present disclosure.

FIG. 12 illustrates a flow chart of a method 1200 for motion sensor fusion in indoor localization of an object according to various embodiments of the present disclosure, as may be performed by one or more components of the network 300 (e.g., the target 301 or the anchors 302). The embodiment of the method 1200 shown in FIG. 12 is for illustration only. One or more of the components illustrated in FIG. 12 can be implemented in specialized circuitry configured to perform the noted functions or one or more of the components can be implemented by one or more processors executing instructions to perform the noted functions.

As illustrated in FIG. 12, the method 1200 begins at step 1201. At step 1201, an electronic device receives at least one wireless signal measurement and motion sensor measurements. This could include, for example, the target 301 receiving at least one UWB measurement 405 and motion sensor measurements 410 (e.g., from an IMU). In some embodiments, the UWB measurements 405 are UWB DL-TDoA measurements.

At step 1203, the electronic device generates a location estimate based on the at least one wireless signal measurement. This could include, for example, the target 301 using the background EKF-RW 520 to generate location estimates, such as shown in FIG. 5.

At step 1205, the electronic device determines whether a step is present based on the motion sensor measurements. This could include, for example, the target 301 performing the step detection operation 505 to detect a step, such as shown in FIG. 5.

At step 1207, in response to determining that a step is present, the electronic device determines a step heading offset based on the location estimate and the motion sensor measurements, and determines a step length and heading based on the motion sensor measurements and the step heading offset. This could include, for example, the target 301 performing the heading calibration 515 to determine the heading offset, and performing the step size and heading calculation 510 to obtain the step length and heading, such as shown in FIG. 5.

At step 1209, the electronic device determines a location of an object based on at least one of (i) the at least one wireless signal measurement or (ii) the step length and heading. This could include, for example, the target 301 determining the location of the target 301 and generating a location output 420, such as shown in FIG. 4.

Although FIG. 12 illustrates one example of a method 1200 for motion sensor fusion in indoor localization of an object, various changes may be made to FIG. 12. For example, while shown as a series of steps, various steps in FIG. 12 could overlap, occur in parallel, occur in a different order, or occur any number of times.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method comprising:

receiving at least one wireless signal measurement and motion sensor measurements;

generating a location estimate based on the at least one wireless signal measurement;

determining whether a step is present based on the motion sensor measurements;

in response to determining that a step is present:

determining a step heading offset based on the location estimate and the motion sensor measurements; and determining a step length and heading based on the motion sensor measurements and the step heading offset; and determining a location of an object based on at least one of (i) the at least one wireless signal measurement or (ii) the step length and heading.

2. The method of claim 1, wherein the at least one wireless signal measurement comprises ultra-wide band downlink time difference of arrival (UWB DL-TDoA) measurements.

3. The method of claim 1, further comprising:

in response to determining that a step is present, determining an updated step size parameter based on the location estimate and the motion sensor measurements, wherein the step length and heading are determined based on the motion sensor measurements, the step heading offset, and the updated step size parameter.

4. The method of claim 3, wherein determining the updated step size parameter comprises:

determining step size parameter values for multiple steps based on the location estimate and the motion sensor measurements; and determining an average of the step size parameter values for the multiple steps.

5. The method of claim 1, wherein determining the step heading offset based on the location estimate and the motion sensor measurements comprises:

determining whether the following conditions are satisfied:

whether the object is moving in a straight line based on the motion sensor measurements, whether there are a sufficient number of wireless signal measurements satisfying a condition, and whether the object is in motion based on displacement data;

in response to all of the conditions being satisfied, estimating a heading based on the location estimate; and generating the step heading offset based on a comparison of the estimated heading to heading information obtained from the motion sensor measurements.

6. The method of claim 5, wherein determining whether the object is moving in a straight line based on the motion sensor measurements comprises one of:

determining whether a predetermined percentile of gyroscope readings is less than a first predetermined threshold value; or determining whether a variance of orientation information in a prior time period is less than a second predetermined threshold value.

7. The method of claim 1, wherein generating the location estimate based on the at least one wireless signal measurement comprises:

predicting an initial location estimate using a tracking filter and the at least one wireless signal measurement;

removing any outliers from the at least one wireless signal measurement; and updating the initial location estimate using the tracking filter.

8. The method of claim 1, wherein determining whether the step is present based on the motion sensor measurements comprises:

obtaining linear acceleration information from the motion sensor measurements; and determining that the step is present for each peak in the linear acceleration information.

9. A device comprising:

a transceiver; and a processor operably connected to the transceiver, the processor configured to:

receive at least one wireless signal measurement and motion sensor measurements;

generate a location estimate based on the at least one wireless signal measurement;

determine whether a step is present based on the motion sensor measurements;

in response to determining that a step is present:

determine a step heading offset based on the location estimate and the motion sensor measurements; and determine a step length and heading based on the motion sensor measurements and the step heading offset; and determine a location of an object based on at least one of (i) the at least one wireless signal measurement or (ii) the step length and heading.

10. The device of claim 9, wherein the at least one wireless signal measurement comprises ultra-wide band downlink time difference of arrival (UWB DL-TDoA) measurements.

11. The device of claim 9, wherein the processor is further configured to:

in response to determining that a step is present, determine an updated step size parameter based on the location estimate and the motion sensor measurements; and determine the step length and heading based on the motion sensor measurements, the step heading offset, and the updated step size parameter.

12. The device of claim 11, wherein to determine the updated step size parameter, the processor is configured to:

determine step size parameter values for multiple steps based on the location estimate and the motion sensor measurements; and determine an average of the step size parameter values for the multiple steps.

13. The device of claim 9, wherein to determine the step heading offset based on the location estimate and the motion sensor measurements, the processor is configured to:

determine whether the following conditions are satisfied:

whether the object is moving in a straight line based on the motion sensor measurements, whether there are a sufficient number of wireless signal measurements satisfying a condition, and whether the object is in motion based on displacement data;

in response to all of the conditions being satisfied, estimate a heading based on the location estimate; and generate the step heading offset based on a comparison of the estimated heading to heading information obtained from the motion sensor measurements.

14. The device of claim 13, wherein to determine whether the object is moving in a straight line based on the motion sensor measurements, the processor is configured to perform one of:

determine whether a predetermined percentile of gyroscope readings is less than a first predetermined threshold value; or determine whether a variance of orientation information in a prior time period is less than a second predetermined threshold value.

15. The device of claim 9, wherein to generate the location estimate based on the at least one wireless signal measurement, the processor is configured to:

predict an initial location estimate using a tracking filter and the at least one wireless signal measurement;

remove any outliers from the at least one wireless signal measurement; and update the initial location estimate using the tracking filter.

16. The device of claim 9, wherein to determine whether the step is present based on the motion sensor measurements, the processor is configured to:

obtain linear acceleration information from the motion sensor measurements; and determine that the step is present for each peak in the linear acceleration information.

17. A non-transitory computer readable medium comprising program code that, when executed by a processor of a device, causes the device to:

receive at least one wireless signal measurement and motion sensor measurements;

generate a location estimate based on the at least one wireless signal measurement;

determine whether a step is present based on the motion sensor measurements;

in response to determining that a step is present:

determine a step heading offset based on the location estimate and the motion sensor measurements; and determine a step length and heading based on the motion sensor measurements and the step heading offset; and determine a location of an object based on at least one of (i) the at least one wireless signal measurement or (ii) the step length and heading.

18. The non-transitory computer readable medium of claim 17, wherein the at least one wireless signal measurement comprises ultra-wide band downlink time difference of arrival (UWB DL-TDoA) measurements.

19. The non-transitory computer readable medium of claim 17, wherein the program code further causes the device to:

in response to determining that a step is present, determine an updated step size parameter based on the location estimate and the motion sensor measurements; and determine the step length and heading based on the motion sensor measurements, the step heading offset, and the updated step size parameter.

20. The non-transitory computer readable medium of claim 19, wherein the program code to determine the updated step size parameter comprises program code to:

determine step size parameter values for multiple steps based on the location estimate and the motion sensor measurements; and determine an average of the step size parameter values for the multiple steps.

* * * * *